United States Patent [19]
Howard

[11] 3,825,281  
[45] July 23, 1974

[54] TRAILER COUPLING MEANS

[76] Inventor: Durrell U. Howard, 306 Krameria, San Antonio, Tex. 78213

[22] Filed: Nov. 12, 1971

[21] Appl. No.: 198,378

[52] U.S. Cl. .......................... 280/423 R, 280/438 R
[51] Int. Cl. ............................................ B62d 53/06
[58] Field of Search ..................... 280/423, 438, 491

[56] References Cited
UNITED STATES PATENTS

| | | | |
|---|---|---|---|
| 1,397,688 | 11/1921 | Keesler et al. | 280/438 R |
| 1,853,701 | 4/1932 | Schlaegel | 280/438 R |
| 1,933,622 | 11/1933 | Fellows | 280/438 R X |
| 2,038,265 | 4/1936 | Bradley | 280/423 R |
| 2,858,143 | 10/1958 | Prichard et al. | 280/438 R X |
| 3,390,896 | 7/1968 | Philapy | 280/423 |

FOREIGN PATENTS OR APPLICATIONS

| | | | |
|---|---|---|---|
| 280,687 | 1/1967 | Australia | 280/491 E |
| 562,246 | 6/1960 | Belgium | 280/423 R |

Primary Examiner—Leo Friaglia  
Attorney, Agent, or Firm—Pollock, Philpitt & Vande Sande

[57] ABSTRACT

The disclosure relates to a means of coupling a trailer to an automobile wherein the weight of the trailer carried by the coupling means is distributed and carried by the automobile at a point adjacent to or forward of its rear axles. A self-aligning and shock-absorbing coupling means is also disclosed. The coupling means uses a fifth wheel and spring-loaded roller-detent means to maintain alignment in yaw between the vehicle and the trailer. A speed-responsive means reduces the "stiffness" in yaw between the automobile and the trailer when the vehicle speed is below a predetermined value.

9 Claims, 9 Drawing Figures

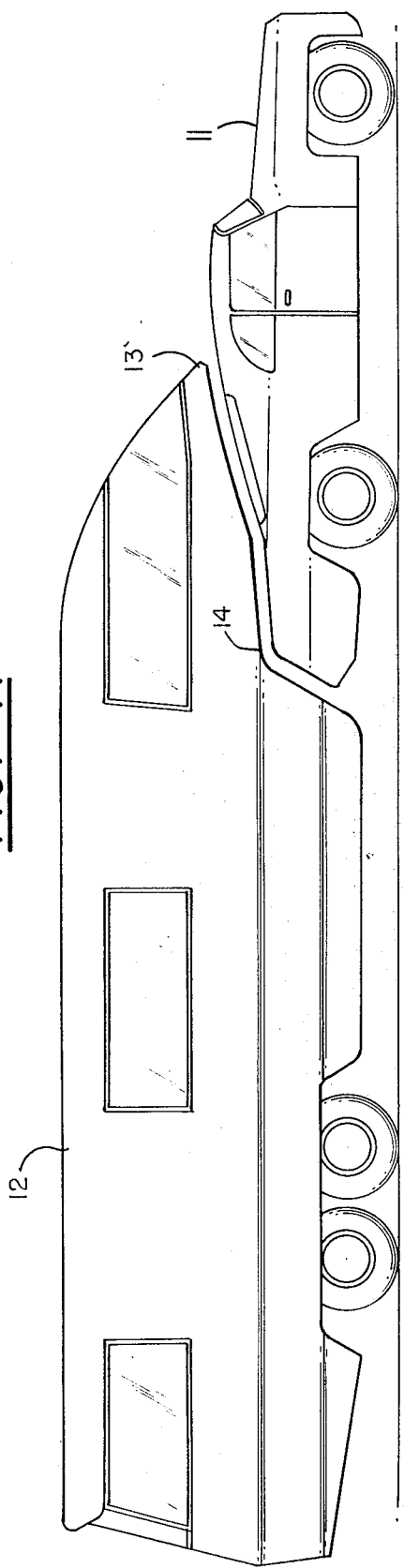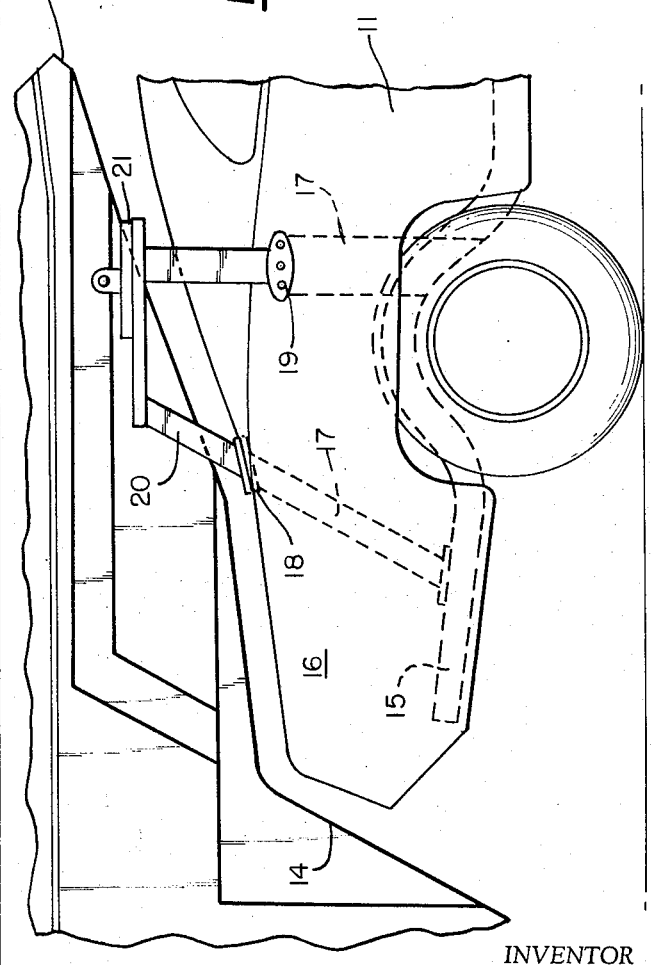
INVENTOR
Durrell U. Howard

INVENTOR
Durrell U. Howard

ATTORNEY

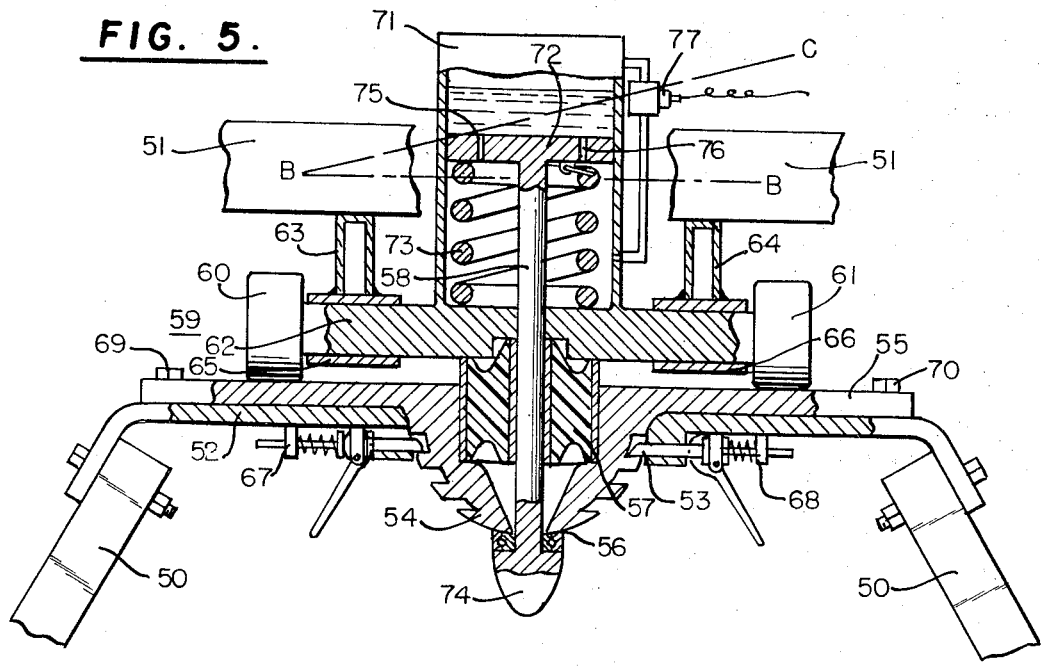
FIG. 5.
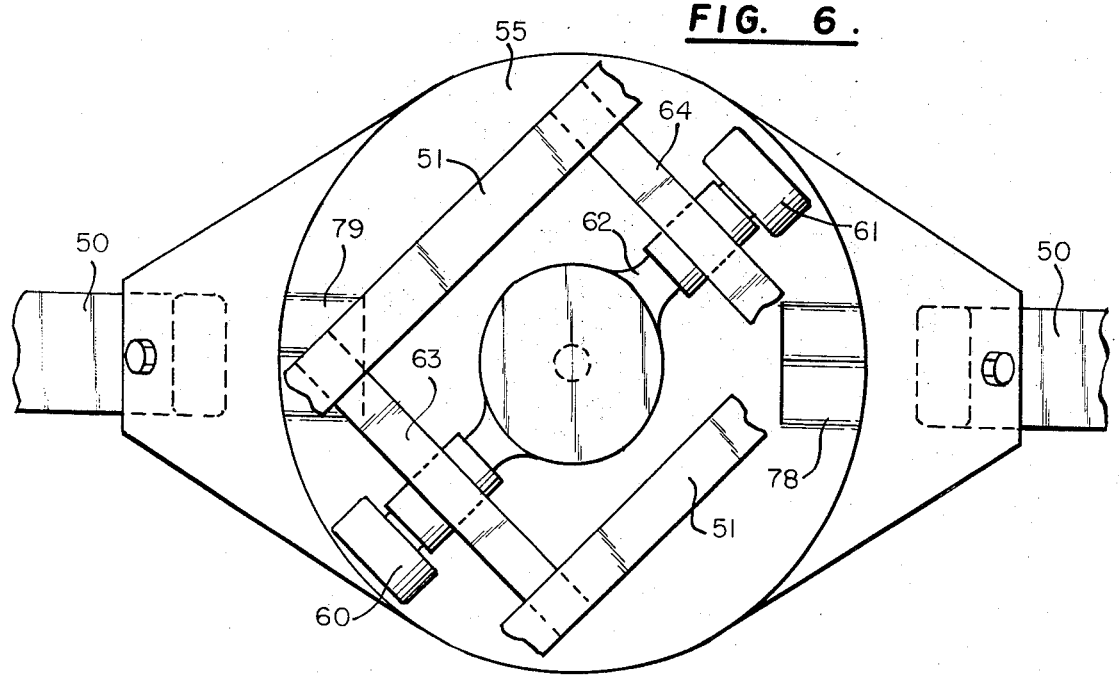
FIG. 6.
INVENTOR
Durrell U. Howard
BY 
ATTORNEY INVENTOR
Durrell U. Howard

BY
ATTORNEY

TRAILER COUPLING MEANS

BACKGROUND OF THE INVENTION

This invention relates to a trailer coupling means adapted to connect a house trailer to a towing vehicle. At present, trailers that are used for dwellings have increased in size until they are many times larger than the vehicle which tows them. This not only presents a difficult problem of how to attach them to the towing vehicle but also presents difficult problems in how to balance the kinetic loading to ensure some area of reasonable safety when the vehicle is being towed along a highway. It is well-known by those who have driven automobiles towing these large trailers that the tendency of the heavy trailer to take charge and deflect the automobile is quite pronounced. For example, the trailer, when hit by a gust of wind, may set up a swaying motion which will require very careful driving to keep the automobile and trailer on the road.

This type of trailer also exerts a substantial downward pressure on the towing vehicle. If this load is applied at a distance behind the rear axle of the towing vehicle, it tends to tip the vehicle about its rear wheels and reduce the load on the front wheels of the vehicle to the point where adequate steering and braking is jeopardized. In addition, unevenness of the roadway can set up a vertical oscillation that will tend to rapidly raise and lower the front end of the vehicle, resulting in broken front springs, rapid tire wear, and difficult and dangerous steering. The same unsatisfactory distribution of weight also results in overloading the rear axle of the automobile. This same extreme pivoting action between the trailer and the vehicle results in the rear of the trailer contacting the roadway when crossing curbs, gutters, and excessively crowned roadways, owing to the greatly multiplied vertical movements of the rear wheels of the tow car. This often results in substantial damage to the undercarriage of the trailer.

It is also known in the art that one can overcome some of the aforementioned difficulties by putting an extension on the trailer tongue and attaching it to the towing vehicle in front of the rear axle. Examples of this type of connection are illustrated in U.S. Pat. Nos. 2,162,481, and 2,212,081 issued Aug. 20, 1940. Unfortunately, this type of connection has resulted in the loss of use of the vehicle's trunk, and generally presents a rather unsightly appearance or excessive body modification. Additionally, the increased size of very large trailers in recent years has also made the long extension tongues somewhat unfeasible in view of the overall length of the combined car and trailer rig.

Another problem that presents itself is that of sway control, since the lever arm extending rearwardly of the automobile will tend to move the car physically when the trailer begins to yaw. Various types of anti-sway bars and snubbing arrangements have been proposed in the prior art; however, the problems of adapting these arrangements in a device which would locate the center of weight distribution forwardly of the rear axle have been substantial.

OBJECTS OF THE INVENTION

It is therefore an object of this invention to provide a means and method of pulling a large trailer with an automobile wherein the weight on the front portion of the trailer is distributed or applied to all four wheels of the towing vehicle. This means that the four wheels of the towing vehicle support the weight of the front portion of the trailer and reduce the wear and tear on the rear axle and the front tires. This also dampens the normal vertical movements of the trailer about its pivot axis, since there is no lever arm to accentuate the vertical movement of the trailer towing point.

It is another object of this invention to provide a means and method for adapting the modern streamlined automobile to carry a demountable frame portion on the exterior of the vehicle to support the trailer forwardly of the rear axle, while maintaining the esthetic appearance of the automobile when the demountable frame is removed.

It is another object of this invention to provide an anti-yaw roll and pitch control means which immeasurably add to the safety of the towing arrangement. Both yaw and roll control are applied in a towing arrangement where the weight of the trailer is distributed forwardly of the rear axle of the vehicle.

It is another object of this invention to disclose a new and useful configuration of a house trailer which utilizes previously unused space above the rear portion of a modern streamlined automobile vehicle.

It is another object of this invention to provide a speed-responsive anti-yaw control means which will prevent yaw and sway at high speeds but will permit yaw moment at low speeds.

BRIEF DESCRIPTION OF THE DRAWINGS

FIG. 1 is a side elevation view of a trailer and automobile coupled in accordance with the arrangement disclosed herein;

FIG. 2 is a close-up side elevation of the demountable frame assembly and the means by which the weight is distributed forward of the rear axle of the vehicle;

FIG. 5 is a cross-sectional view of the fifth wheel means used to couple the trailer to the automobile;

FIG. 6 is a partial plan view of the fifth wheel assembly used to couple the automobile and trailer together;

DESCRIPTION OF THE PREFERRED EMBODIMENTS

Figure 3:
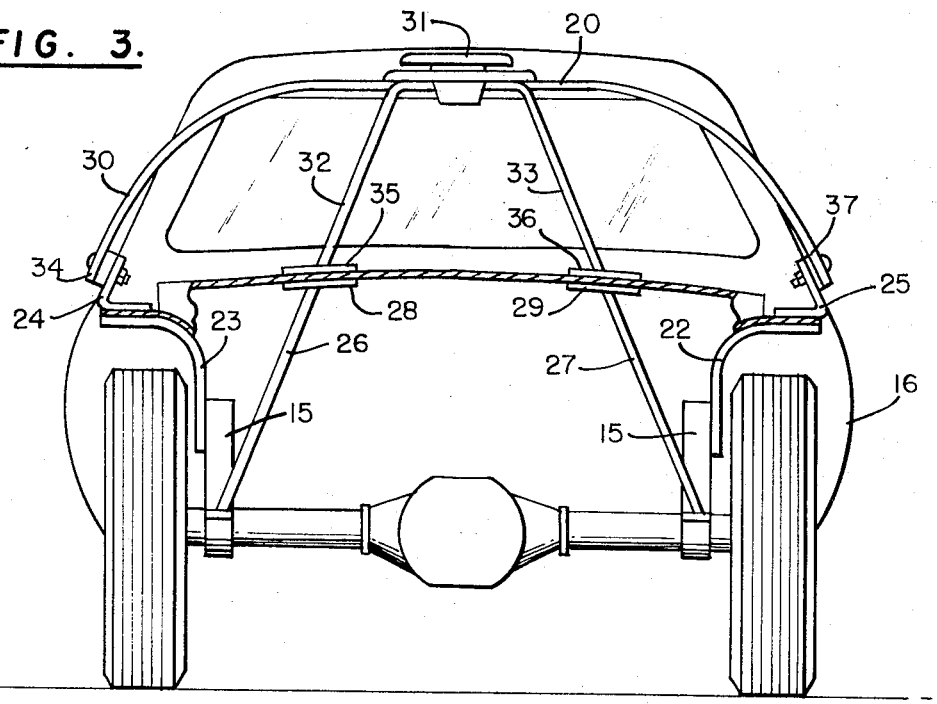
FIG. 3 is a cross-sectional view of a motor vehicle illustrating the demountable frame means, and subframe means illustrated in FIG. 2.

FIG. 1 illustrates an automobile 11 with an attached trailer 12 adapted and configured to utilize fully the novel concepts expressed in my invention. Trailer 12 defines a forward portion 13 which overhangs the rear portion of the automobile 11 and provides a cut-out space 14 for receiving the rear portion of automobile 11. This enables the designer of the trailer to provide an additional four to ten feet of trailer length without increasing the overall length of the trailer and automobile combined. In addition, the customary gap between the trailer and the automobile is eliminated, thereby eliminating the wasteful use of space in the length of the overall vehicle.

FIG. 2 is an enlarged detail of the general coupling arrangement illustrating the manner in which the trailer is attached to the automobile. The automobile 11 comprises a frame 15 which connects the front and rear wheels and supports the automobile body 16. Although an automobile with a frame or carriage member such as that illustrated at 15 has been used for the purposes of illustration, it should be noted that any type of body and frame structure including the unitized or integral body frame member could be used. The term "frame" is used to refer to the supporting members or main load-carrying members of the automobile structure. A sub-frame means 17 is attached to the frame 15 and extends upwardly to the body surface and terminates in mounting plates 18 and 19. These mounting plates are formed flush with the automobile surface and provide a method and means for disconnecting the upper demountable frame means 20 from the automobile body when the trailer is not being towed. Thus, it is possible to have an extremely strong frame means for supporting a fifth wheel assembly wherein the load of the fifth wheel assembly will be transmitted to the carriage at a point forwardly of the rear wheels while still preserving the esthetic appearance of the automobile when said frame means 20 is not being used. Mounting plates 18 and 19 may be chrome-plated, or they may be flush with the body and equipped with decorative members to conceal their function when the demountable frame means 20 is not mounted on the automobile. The fifth wheel assembly generally illustrated at 21 provides the coupling between the trailer 12 and the automobile 11 and provides for both yaw, pitch, and roll movement of the trailer with respect to the automobile. The operation and construction of the fifth wheel means 21 will be hereinafter described and illustrated with FIGS. 5, 6, 7 and 8.

The placement of the fifth wheel means 21 is important. If the center of weight distribution is placed to the rear of the rear wheel means, the moment arm between that center and the rear wheels will provide leverage which will tend to lift the automobile's front wheels and cause problems normally associated with the conventional coupling of trailers to automobiles. While these problems would be to some extent alleviated if the center of weight distribution were placed directly over the rear wheel, it has been found advantageous to place the center of weight distribution slightly forward of the rear wheels. This enables a portion of the downward component to be carried by the front wheels and provides for a more even weight distribution. In addition, the moment arm which would tend to distort the steering effect of the front wheels has been eliminated. Additionally, by mounting the center weight distribution adjacent the rear wheel, any vertical pitching motion in the trailer body due to up-and-down motion of the rear wheels of the car is minimized. This pitching moment is greatly exaggerated as the coupling moves out away from the rear wheels, particularly if the direction is to the rear of the automobile.

FIG. 3 is a cross-sectional illustration of the embodiment illustrated in FIG. 2. This figure illustrates the forward half of the sub-frame means 22 and 23 connected to the carriage or frame 15 and terminating in the support plate means 24 and 25 at the body surface. The rearward and inner members of the sub-frame means designated by numerals 26 and 27 extend from the frame means 15 to the mounting plates 28 and 29.

The demountable frame means 20 has complementary members extending to the forward mounting plates 24 and 25. This portion 30 of the demountable frame means provides a bow-shaped section connecting the mounting plates with the fifth wheel support generally indicated at 31. The demountable frame means 20 also defines inner support members 32 and 33 which extend from the mounting plates 28 and 29 to the fifth wheel support means 31. This demountable frame means has its own matching mounting plates 34, 35, 36 and 37 which provide for a secure means of connecting the demountable frame means to the sub-frame means.

Figure 4:
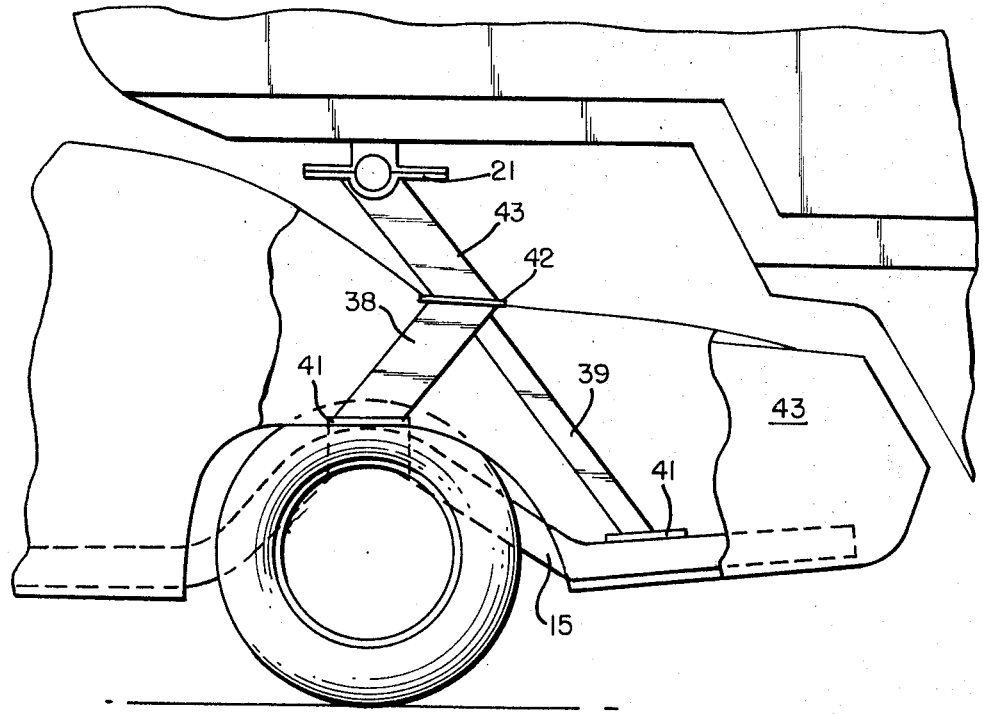
FIG. 4 is a close-up and partial section of a side elevation view of an alternate embodiment of my invention.

An alternate form of the demountable frame means and sub-frame means is illustrated with respect to FIG. 4. While the embodiment illustrated in FIGS. 2 and 3 illustrates one method of distributing the load, FIG. 4 illustrates another, utilizing the well-known cantilever principle. The sub-frame means illustrated at 38 and 39 is firmly attached to frame 15 by means of plates 40 and 41. These plates are intended to be weight-distributing plates and aid in the transmittal of the stresses or load over an area of frame member 15, rather than a single point. The sub-frame illustrated at 38 and 39 terminates at a mounting plate 42. This mounting plate is in reality a pair of plates mounted slightly inboard of the rear fenders illustrated at 43. The demountable frame means 43 would be formed as a wishbone or V-frame to distribute the load from the single point source at coupling means 21 to the mounting plates 42.

Alternately, the pair of mounting plates 42 could be replaced with a single mounting plate, and an interior cross-connecting member (not shown) which would connect the two sides of the sub-frame illustrated at 38 and 39.

Again, due to the structural engineering, and placement of loads and supports, the center of weight distribution for the coupling means 21 is placed forwardly of the rear wheel of the automobile.

Figure 9:
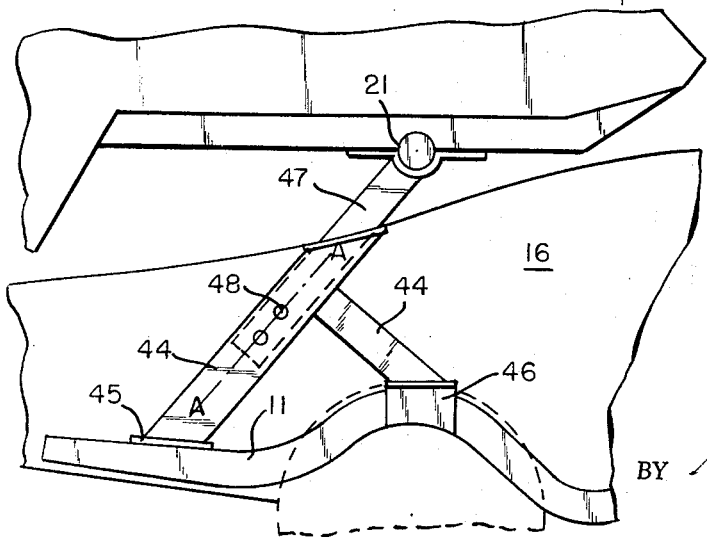
FIG. 9 is a side elevation view illustrating an alternate embodiment of the frame assemblies used in distributing the load of the trailer forwardly of the rear axle of the automobile.

Still another embodiment of the invention is illustrated in FIG. 9 wherein the sub-frame means 44 is connected to the carriage or frame means 11 in a manner similar to that discussed previously for FIGS. 2, 3 and 4. This may be by means of bolts, welding, brackets, or mounting plates. FIG. 9 specifically discloses mounting plates 45 and 46. In the embodiment illustrated in FIG. 9, a collar is provided on each side of the sub-frame means 44 to provide for reciprocal movement of the demountable frame means 47. This reciprocal movement along the axis illustrated at AA enables the loading point of the fifth wheel assembly 21 to be raised and lowered with respect to the automobile body 16. This enables the owner of an automobile having a body configuration as illustrated in FIG. 9 to use the trailer configuration illustrated in FIG. 1. Even though the exact configurations of the trailer and automobile do not match, one can adapt simply by elevating the demountable frame means 47. The position of frame means 47 is fixed by means of pins or bolts 48. This adjustment along axis AA can also be used to move the center of weight distribution forwardly or rearwardly of the center axis of the rear wheel of the automobile.

When the trailer rolls about its axis, with respect to the automobile, it is necessary for some adjustment to be made in the fifth wheel coupling means. This is normal for small gradual movements as, for example, when an automobile moves from the center to the side of a heavily-crowned street or highway, or begins a banked turn. Sudden roll movements of large gradation which might be caused by a gust of wind should be countered as quickly as possible to prevent undue gyrations in shifting of the load and weight distributions.

The fifth wheel assembly 21 referred to in FIGS. 2, 3, 4 and 9, provides for roll, pitch, and yaw movement of the trailer with respect to the automobile. This fifth wheel coupling means is designed to connect the first frame means 50 or the demountable frame for the automobile to a second frame means 51, connected to the trailer, and provide for movement between the two. A first plate means 52 is securely mounted by means of bolts or welding to the first frame means 50 and provides a stable platform for the fifth wheel coupling device. The plate means 52 defines an aperture 53 which receives a protuberance 54 formed on the other side of a second plate means 55. The second plate means also defines aperture 56 and provides for a resilient mounting means 57 for a pivot pin 58. This pivot pin 58 also extends through the aperture 53 defined in plate 52 and forms the precise center of rotation for the fifth wheel assembly when compensating for yaw movements of the trailer.

The load of the trailer 51 is carried by a roller means 59 generally defined by rollers 60 and 61 and cross-bar 62. This cross-bar supports the channel members 63 and 64 which are mounted to the cross-bar by means of sleeves 65 and 66. The cross member 62 rotates about pivot pin 58 as the trailer varies its yaw angle.

In operation, the fifth wheel assembly, broadly generalized by numerals 54 through 66, is mounted on the trailer frame. The automobile is backed under the trailer until the aperture 53 defined by plate 52 is generally underneath the protuberance 54 defined on the underside of the fifth wheel device. The trailer is then lowered, and its plates 52 and 55 come together, the protuberance 54 gradually aligning the two plates by means of its general conical or hemispheroidal shape. After the plates have made contact, the locking means 67 and 68 grip the protuberance and hold the two plates in alignment. The plates are then secured by means of fasteners which are illustrated as bolts 69 and 70. The fifth wheel coupling device illustrated in FIG. 5 is also equipped with a shock absorber and resilient mounting to provide for roll movement of the vehicle with respect to the automobile and to provide for cushioning and dampening of vertically-transmitted shocks to the coupling members themselves.

Generally speaking, the load and any attendant shocks or variations in load are transmitted directly from frame 50 through sub-plates 52 and 55 to the roller means 59, and directly to the trailer frame 51. The downward component of the load is transmitted in the reverse order from frame 51 through channel 63, cross-member 62, rollers 60 and 61 plates 55 and 52, and the demountable frame assembly 50.

The shock-absorbing means generally designated as 71 has a plunger 72 mounted on the upper portion of pivot pin 58 and a spring-biasing member 73. This spring-biasing member 73 provides for a positive bias between the plate member 55 and the cross-member 62. As spring means 73 exerts its force upwardly, it transmits the upward component of this force through flange 72 to pivot pin 58. The force is then transmitted in two directions, one being through the resilient member 57, and the other through the end portion 74 of pivot pin 58 to the protuberance 54 and plate 55.

The adjustable biasing between the roller means 59 and plate means 55 is useful in two ways. First, it provides a positive bias for the roller detent combination to be described and illustrated with respect to FIG. 6. Secondly, it also assists in providing for the roll movement in the coupling means. Any sudden shifts in the roll axis of the trailer is countered in the fifth wheel coupling by means of the fluid contained in the shock absorber 71. Since the liquid is essentially incompressible, the liquid contained in the lower portion of 71 below flange 72 receives the shock and tends to maintain the roller means 59 and plate means 55 in a fixed relationship. This force is transmitted through pin 58. For gradual movements, however, the liquid is allowed to flow through the port opening 75 and 76 to the upper chamber of shock absorber 71. To illustrate, as the frame member 51 moves from axis BB to the axis defined by BC, the wheel 61 of roller means 59 will leave plate 55. The axis of pivot pin 58 will also move to the side as the flange 72 moves downwardly. The lateral movement of pivot pin 58 is absorbed by the shock-absorbing resilient means 57. This allows pivot pin 58 to move to left or right, depending upon the roll axis of the trailer. After the roll axis of the trailer has moved from BC back to its original position BB, the fluid is allowed to flow back through port 75 and port 76 as the roll axis is normalized. The check valve 77 prevents any sudden movement of the fluid to the upper chamber. A dump valve BB, the fluid is allowed is connected to the automobile to permit rapid passage of the fluid from the lower portion to the upper portion of chamber 71. Dump valve 77 is speed-responsive and is connected to the automobile for operation. In addition to normal operation or override, the valve will automatically open when the speed of the automobile drops below a predetermined level, as for example, ten miles per hour. If the operator is towing the trailer diagonally across the curve or other sharp gradient, the roll axis of the car will be different from the roll axis of the trailer, and the rate of change between the two will be quite rapid. Under normal circumstances, the shock-absorbing means 71 would provide that the trailer and car maintain a relatively rigid alignment. The speed-responsive nature of dump valve 77 will open valve 77 and allow for fairly rapid fluctuations in the roll axis between frame member 51 and frame member 50. After the operator has driven the vehicle and trailer over the curve or other problem area, the valve will close to again present the safety features noted above.

FIG. 6 illustrates a roller-detent mechanism for maintaining the automobile and trailer at a specific axial alignment. Plate member 55 is provided with a pair of detents 78 and 79. Spring member 73 biases the roller members 60 and 61 into the detents 78 and 79 when the trailer and the automobile are aligned. This tends to maintain the two in an axial alignment and tends to dampen small sharp changes in alignment due to gusts of wind, driver movements and the like. The spring means 73, and the incompressible liquid present in the shock-absorber 71 also tend to lock the rollers 60 and 61 into detent means 78 and 79. This provides an anti-sway protection since any sudden large movements of amplitude would require that rollers 60 and 61 move out of detent 78 and 79. These rollers are normally held into the detents by spring 73 and the incompressibility of the liquid below piston 72. As noted previously, the imcompressible liquid would prevent any rapid movement of piston 72 but would allow any gradual changes due to normal highway curves. At slow speeds wherein the driver is backing or maneuvering the trailer, the speed-responsive nature of dump valve 77 will open, the valve thereby permitting the rollers 60 and 61 to move out of detent 78 and 79 as the driver executes his turn. This type of yaw control or anti-sway control is extremely useful when the trailer and automobile are buffeted by strong side or lateral wind forces or when the driver is attempting to brake on a steep hill, or when the driver is negotiating a passage over ice or other slippery road conditions.

Under normal circumstances, the weight of the trailer will be substantially greater than that of the car, and if the axis of movement deviates substantially from that of the car, the trailer will tend to slip around to the side of the automobile, thereby displacing and rolling both the trailer and the car. Alternately, the trailer in its sidewise movement will exert a sideward moment on the automobile which will tend to flip it, which in turn will result in the overturning of the trailer. The anti-sway control tends to maintain the two in a locked condition and allows the driver to compensate for any skid in the manner in which a conventional skid is compensated for. By turning the wheels of the automobile in the direction of the skid, the driver can to some extent prevent the trailer and automobile rig from going out of control.

The roller-detent mechanism may be sized to provide any amount of locking or anti-sway control desired. By varying the diameters of the roller 60 and 61, the relative dimensions of the detent 78 and 79, and the relative strength of the shock-absorber 71, the sway control may be made to cover a wide variety of loading conditions.

The fifth wheel coupling means also provides for free rolling pitch moment between the trailer and automobile. The pitch moment is absorbed as frame members 63 and 64 rotate about axle 62 by virtue of collars 65 and 66. The rotation of rollers 60 and 61 would also absorb pitch moment between the trailer and automobile.

Figure 7:
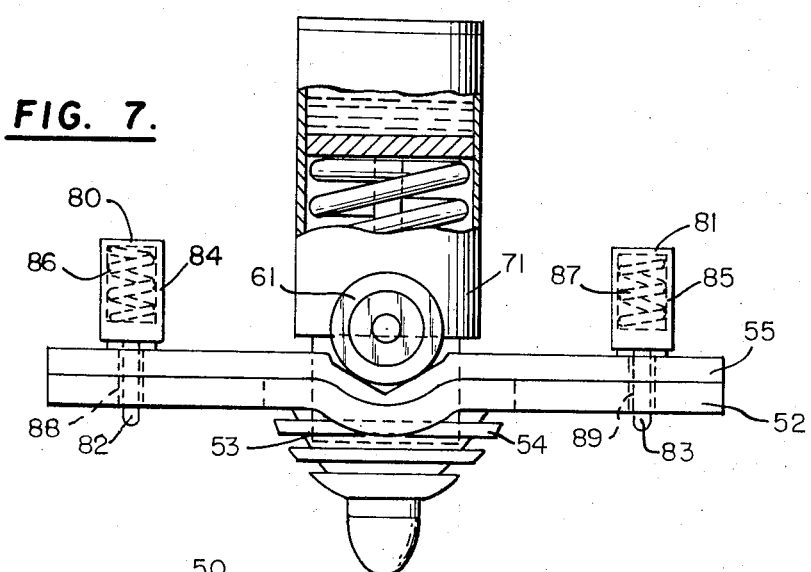
FIG. 7 is a side and partial cross-sectional view of an alternate form of the fifth wheel assembly used to couple the trailer to the automobile.
Figure 8:
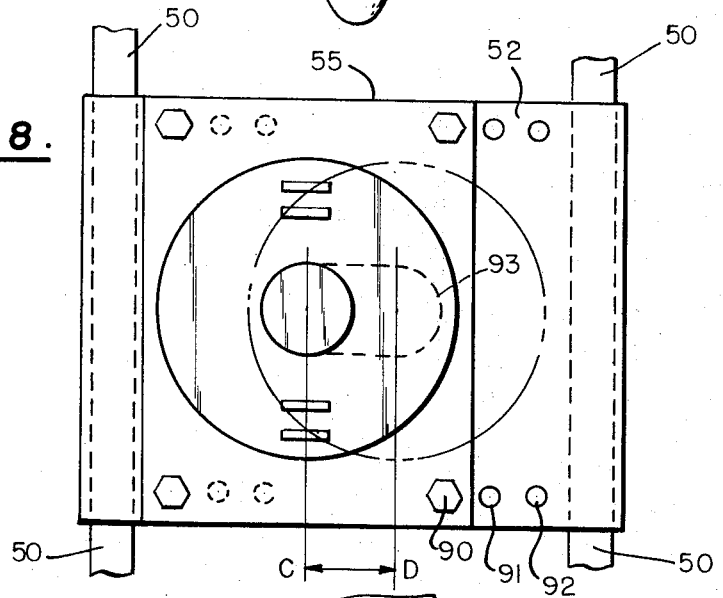
FIG. 8 is a top plan view of an alternate embodiment of the invention illustrating means to adjust the loading point of the trailer along the car's longitudinal axis.

FIG. 7 and FIG. 8 represent modifications of the fifth wheel assembly illustrated and previously described with respect to FIGS. 5 and 6. FIG. 7 illustrates an alternate self-aligning and locking mechanism for attaching the trailer to an automobile. As may be expected, providing the exact alignment for the locking means 69 and 70 may be somewhat difficult even though the protuberance 54 has aligned plates 55 and 52. Since there is a rotational alignment as well as axial alignment, it is necessary to ensure that the vehicle and the trailer are aligned perfectly before the locking means 69 and 70 are brought into proper alignment. In FIG. 7, the locking means 69 and 70 have been replaced by locking means 80 and 81. These locking means are securely mounted to plate 55 and provide spring-loaded plungers 82 and 83 which are normally partially recessed within the upper portion 84 and 85 of the spring-loaded self-aligning means.

In coupling the trailer to the automobile, the operator drives the vehicle under the trailer, as discussed previously with respect to FIG. 5. The trailer is then lowered (conventional jacking apparatus could be used) as protuberance 54 slides through aperture 53 defined in plate 52. At this point, unless there is perfect alignment, the spring means 87 and 88 will be compressed, and the plungers 82 and 83 will be resting on the upper surface of plate 52. The driver then pulls away, towing the vehicle, and as the vehicle and the trailer come into alignment the plungers 82 and 83 will snap through the aperture 88, 89 defined in plate 52 and provide an automatic, spring-loaded self-aligning locking means.

FIG. 8 illustrates an alternate embodiment of the invention. In this embodiment, the operator of the vehicle can select any one of three positions for the center of weight distribution. If it is desired to shift the center of weight distribution forward, plate 55 then is moved to the extreme position illustrated by letter C. If, on the other hand, the driver wishes to shift the center of weight distribution as far rearward as possible, the center axis is shifted, as indicated by the numeral D. The protuberance 54 extends through an elongated slot-like aperture 93 defined in plate 52. This allows the plate to move through the entire range CD of longitudinal movement. The plates 55 and 52 are secured to one another at the three positions by bolts or other fasteners. For example, bolt 90 may be secured at its present location, or secured in aperture 91 or aperture 92.

It is understood that the present disclosure is for the purposes of illustration only, and this invention includes all modifications and equivalents which fall within the scope of the following appended claims:

I claim:

1. An apparatus for joining an automobile or like vehicle wherein said vehicle has a carriage with front and rear wheels and body means, to a trailer, wherein said trailer has a frame means extending forwardly of its wheels for coupling to said automobile, said apparatus comprising:
   a. sub-frame means mounted on said automobile carriage and extending to said body means,
   b. demountable frame means for said automobile mounted on the exterior of said body means and fixably attached to said sub-frame means,
   c. fifth wheel means mounted between said trailer frame means and said demountable frame means to provide for yaw and roll movement between said trailer frame and said demountable frame means,
   d. said demountable frame means being cantilevered forward of its attachment to said sub-frame to throw the center of weight distribution forward of said rear wheels.

2. In an apparatus for joining a trailer and automobile together, the combination comprising:
   a. an automobile or like vehicle, said automobile having a carriage with front and rear ground wheels and a body means,
   b. sub-frame means mounted on said carriage and extending to said body means, said frame means having a center of weight distribution for the trailer forward of said rear wheels of the automobile, c. demountable frame means mounted on the exterior of said body means and fixably attached to said sub-frame means, d. a trailer, with ground engaging means, said trailer having a second frame means extending forwardly of said ground engaging means for coupling to said automobile, e. first plate means mounted on said demountable frame means, said first plate means defining an aperture therein, f. a second plate mounted on said second frame means, said second plate defining a pivot means which extends through the aperture defined in said first plate means, roller means connected to said trailer frame means for supporting the load of said trailer and transmitting it to said second plate, said roller means being mounted to pivot about said pivot means.

3. An apparatus as claimed in claim 2 wherein said sub-frame means further defines at least one mounting plate mounted on said sub-frame substantially flush with said body member, and matching plate means mounted on said demountable plate means for securing said demountable frame to said sub-frame at a point substantially flush with said body contour.

4. An apparatus as claimed in claim 2 wherein said demountable frame means is cantilevered forward at its attachment to said sub-frame to throw the center of weight distribution forward of said rear wheels.

5. An apparatus as claimed in claim 2 wherein said second plate further defines a detent means for said roller means, said roller and detent means combining to provide self-alignment between said automobile and trailer.

6. An apparatus as claimed in claim 2 wherein said pivot means is resiliently mounted within said aperture defined by said second plate.

7. An apparatus as claimed in claim 2 wherein said second plate defines a protuberance for engagement in the aperture defined by said first plate means, said first plate means also having a self-locking means for gripping said protuberance when said plates are aligned.

8. An apparatus as claimed in claim 2 wherein said roller means is mounted on a second plate means, said first plate means and second plate being mounted together for adjustment along the longitudinal axis of said automobile and trailer.

9. An apparatus as claimed in claim 2 wherein said roller means is mounted on a second plate means with said second plate means secured to said first plate means by a spring-loaded self-aligning means.

* * * * *